March 3, 1959     H. O. SCHERENBERG     2,876,430
TAIL LAMP FOR A MOTOR VECHICLE
Filed June 30, 1954
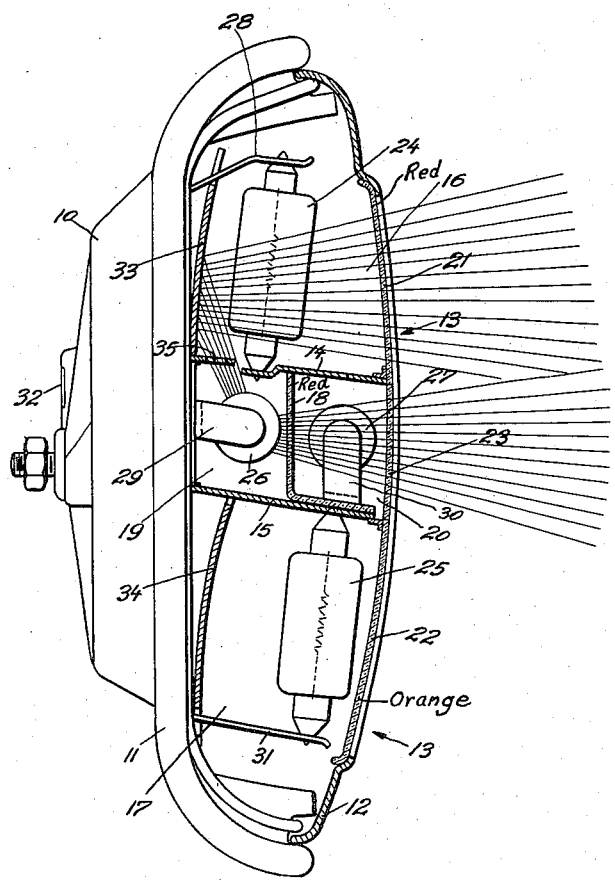
Inventor
HANS O. SCHERENBERG
BY Dicke and Craig
ATTORNEYS.

2,876,430
Patented Mar. 3, 1959

2,876,430

TAIL LAMP FOR A MOTOR VEHICLE

Hans O. Scherenberg, Stuttgart-Heumaden, Germany, assignor to Daimler-Benz Aktiengesellschaft, Stuttgart-Unterturkheim, Germany Application June 30, 1954, Serial No. 440,415

Claims priority, application Germany July 20, 1953

8 Claims. (Cl. 340—74)

My invention relates to a tail lamp for a motor vehicle.

It is the obect of the invention to provide a tail lamp incorporating a tail light, a stop light, a turn indicator light, and a rear search light in a compact arrangement of simple and reliable design.

More specific objects of the present invention are to provide a tail lamp having a transparent cover composed of a red section for the tail light and the stop light, of a clear section for the rear search light, and of an orange-colored section for the turn indicator light, and to provide a tail lamp in which the bulb for the rear search light is so disposed as to emit its rays rearwardly through and past the bulb of the rear search light and laterally upon the reflector associated with the stop light.

Further objects of the invention will appear from the detailed description of a preferred embodiment of the invention following hereinafter, it being understood that such detailed description serves the purpose of illustrating the invention rather than that of limiting the same. The features of novelty will be pointed out in the claims.

The drawing shows a side view of the lamp partly in section.

The lamp comprises a cup-shaped sheet metal or plastic casing 10 having a saddle-shaped grooved rim 11, the groove being engaged by a chromium-plated annular sheet metal member 12 surrounding and carrying a transparent cover 13. The interior of the casing is divided by two substantially parallel partitions 14 and 15 of an opaque material, such as sheet metal, into an upper compartment 16, a median compartment, and a lower compartment 17, the median compartment being subdivided by a red transparent plate 18 into an inner cell 19 and an outer cell 20, such plate extending substantially parallel to the cover 13. The latter is composed of three differently colored transparent sections, each transparent section being shaped to cover one of the three compartments. The uppermost transparent section 21 of cover 13 is red and covers compartment 16. The lowermost transparent section 22 of the cover 13 is oranged-colored and covers compartment 17, whereas the median compartment composed of cells 19 and 20 is covered by the central section 23 which is preferably formed by a clear or white glass plate. Each compartment or cell includes an electric bulb which is preferably of a substantially cylindrical shape. Thus, each of the compartments 16 and 17 contains a bulb 24, or 25 respectively, mounted in upright position so as to extend substantially normally to the partitions 14 and 15, whereas each of the cells 19 and 20 contains a cylindrical bulb 26, or 27 respectively, which extends substantially parallel to the partitions 14 and 15 and to the plate 18.

Current is supplied to each of the bulbs by suitably insulated contact strips 28, 29, 30 and 31 connected to suitable wires included in a cable that extends through an opening 32 provided in the casing 10.

Reflecting hollow mirrors 33 and 34 associated with the bulbs 24 and 25 are mounted in the casing 10 so as to reflect the radiation from bulbs 24 and 25 rearwardly through the transparent cover 13.

Bulb 24 and the red cover section 21 constitute the stop light which is turned on upon actuation of the brake of the vehicle. The bulb 27 covered by the clear section 23 of the transparent cover constitutes the rear search light. Bulb 25 and the associated orange-colored section 22 of the transparent cover constitute the turn indicator which is preferably so operated as to emit a scintillating light. It is to be understood, of course, that in accordance with conventional practice the vehicle may be provided with two tail lamps of the kind described, one at the right and one at the left, lighting of the appropriate indicator bulb by conventional means (not shown) serving to indicate the driver's intention to make a right or left turn.

The brilliancy of the tail light bulb 26 is adversely affected by the bulb 27, since the bulb 27 hides bulb 26 more or less from view. In order to compensate for such adverse effect by the bulb 27, a window, such as a slot 35, is provided according to the present invention within the partition 14 between the cell 19 and the compartment 16, the rays emitted by bulb 26 extending through such slot 35 onto the reflector 33 to be reflected thereby through and past bulb 24 and the red transparent cover section 21. Therefore, when the lamp is viewed from the rear with bulb 26 turned on while bulbs 24 and 27 are turned off, the spectator will perceive a more or less uniformly illuminated red field comprising the area of the upper compartment 16 and the median compartment, or, in other words, comprising the cover sections 21 and 23. In this connection it will be recalled that transparent plate 18 is red and, therefore, will illuminate the clear median section 23 of the cover by red light.

Thus, the provision of slot 35 makes up for the adverse effect upon the brilliancy of bulb 26 by the bulb 27.

It is important in this connection that the tail light bulb 26 extends crosswise with respect to the stop light bulb 24. As a result, the hollow mirror 33 will reflect bulb 26 in form of a horizontal elongated image from which the rays are emitted rearwardly through cover section 21, such image extending crosswise to bulb 24 extending beyond the same on either side. Therefore, bulb 24 cannot absorb the radiation emitted through slot 35 to the same extent as bulb 27 absorbs the radiation emitted from bulb 26.

While I have described my invention with reference to a preferred embodiment thereof, I wish it to be clearly understood that the same is in no way limited to the details thereof, but is capable of numerous modifications within the scope of the appended claims.

What I claim is:

1. Tail lamp for a motor vehicle comprising a casing, a transparent cover therefor, at least one opaque partition extending transversely to said cover and dividing the interior of said casing into adjacent compartments, a bulb and a reflector in a first one of said compartments, a red transparent plate extending substantially parallel to said cover and subdividing a second one of said compartments adjacent to said first compartment into an inner cell and an outer cell, said bulbs being located one behind the other, bulbs in each of said cells, and a window in the zone of said partition bordering said inner cell, said window being located intermediate the bulb in said inner cell and said reflector to admit direct radiation from said last mentioned bulb to the front side of said reflector to thereby enlarge the signal emitted by said lamp, the light rays reflected from said reflector extending in directions substantially parallel to the direction of a line joining said two bulbs.

2. Tail lamp as claimed in claim 1 in which all of said bulbs have a substantially cylindrical shape and extend generally parallel to said transparent cover, said window being formed by a slot, the cylindrical bulb in said inner cell and said slot extending transversely to the cylindrical bulb in said first one of said compartments.

3. Tail lamp for a motor vehicle comprising a casing, a transparent cover therefor, two substantially parallel opaque partitions extending transversely to said cover and dividing the interior of said casing into an upper compartment, a median compartment and a lower compartment, a red transparent plate extending substantially parallel to said cover within said median compartment and subdividing the same into an inner cell and an outer cell, a substantially cylindrical bulb in each of said cells extending substantially parallel to said partitions and to said plate, substantially cylindrical bulbs, one in said upper compartment and one in said lower compartment, said bulbs extending substantially normally to said partitions, and reflectors, one in said upper compartment and one in said lower compartment, said transparent cover having a red section covering said upper compartment and an orange-colored section covering said lower compartment, a slot being provided in said partition between said inner cell and said upper compartment extending substantially parallel to said transparent cover and provided to admit radiation from the bulb in said inner cell to the front side of said reflector in said upper compartment to thereby enlarge the signal of said median compartment.

4. A tail lamp for a motor vehicle comprising a common casing, a transparent cover extending over one side of said casing, two substantially parallel opaque partitions extending transversely to said cover and being spaced from each other, said partitions being further disposed near the center of said transparent cover and dividing the interior of said casing into an upper compartment, a median compartment and a lower compartment, a pair of light bulbs in said median compartment arranged one behind the other and constituting a front bulb and a rear bulb, a colored transparent wall between said front bulb and said rear bulb, a window provided in the upper one of said partitions near said rear bulb, a reflector arranged within said upper compartment and near said window, said reflector being so disposed relative to said window as to reflect the light from said rear bulb passing through said window and impinging on said reflector in a direction towards that portion of said transparent cover which covers said upper compartment, to thereby combine the light signal emitting from said median compartment with that emitting from said upper compartment to form a light signal of an enlarged area, a third light bulb arranged within said upper compartment disposed between said reflector and said respective cover portion, said respective cover portion having the same color as said transparent wall in said median compartment, and a fourth light bulb disposed within said lower compartment and a second reflector disposed behind said fourth light bulb.

5. A tail lamp for a motor vehicle comprising a casing, a housing in said casing, said housing including a transparent cover, a pair of light bulbs in said housing arranged one behind the other and constituting a front bulb and a rear bulb, a colored transparent wall between said front bulb and said rear bulb, a window provided in a wall portion of said housing located to the rear of said colored transparent wall, a reflector in said casing near said window, said reflector being disposed in the path of light rays passing through said window from said rear bulb and reflecting said light rays in directions substantially parallel to the direction of a line joining said two bulbs to thereby combine the light signal emitted through said transparent wall and cover with that emitting from said reflector to form a light signal of an enlarged area.

6. A tail lamp according to claim 5, wherein said casing is provided with a further transparent cover, the light reflected from said reflector passing through said further transparent cover.

7. A tail lamp according to claim 6, wherein said further transparent cover is of the same color as that of said transparent wall.

8. A tail lamp according to claim 6, wherein a light bulb is disposed between said reflector and said further transparent cover.

References Cited in the file of this patent

UNITED STATES PATENTS

| | | |
|---|---|---|
| 1,198,323 | Bullock et al. | Sept. 12, 1916 |
| 1,222,442 | Morford | Apr. 10, 1917 |
| 1,883,466 | Bamford | Oct. 18, 1932 |
| 1,864,706 | Albright | June 28, 1932 |
| 1,930,774 | Scherfee | Oct. 17, 1933 |
| 2,005,761 | Speeg | June 25, 1935 |

FOREIGN PATENTS

| | | |
|---|---|---|
| 367,712 | Great Britain | Feb. 25, 1932 |